United States Patent [19]

Nebelung

[11] Patent Number: 4,585,469
[45] Date of Patent: Apr. 29, 1986

[54] SUPPORT FOR A MOULD PORTION OF A GLASSWARE FORMING MACHINE

[75] Inventor: Hermann H. Nebelung, Zurich, Switzerland

[73] Assignee: Emhart Industries, Inc., Farmington, Conn.

[21] Appl. No.: 713,971

[22] Filed: Mar. 20, 1985

[30] Foreign Application Priority Data

Mar. 28, 1984 [GB] United Kingdom ............... 8408042

[51] Int. Cl.[4] ............................................. C03B 11/06
[52] U.S. Cl. ........................................ 65/359; 65/172; 65/173; 65/360; 65/361
[58] Field of Search ................ 65/357, 359, 360, 362, 65/234, 172, 173, 361

[56] References Cited

U.S. PATENT DOCUMENTS

| 3,021,644 | 2/1962 | Lauck | 65/361 X |
| 3,278,290 | 10/1966 | Rowe | 65/361 X |
| 3,472,639 | 10/1969 | Mumford | 65/361 X |
| 4,449,996 | 5/1984 | Irwin et al. | 65/357 X |

Primary Examiner—Arthur Kellogg
Attorney, Agent, or Firm—H. Samuel Kieser

[57] ABSTRACT

A support for a mould portion comprises an upwardly-facing recess into which a hook portion of the mould portion is received. The support further comprises a projection which enters a slot in the mould portion to prevent transverse movement thereof. The support also comprises a locking member, movable into an operative position in which it projects over an upwardly-facing surface of the mould portion and prevents upwards movement thereof, and moving means for moving the locking member between its operative position and an out-of-the-way position thereof.

9 Claims, 2 Drawing Figures

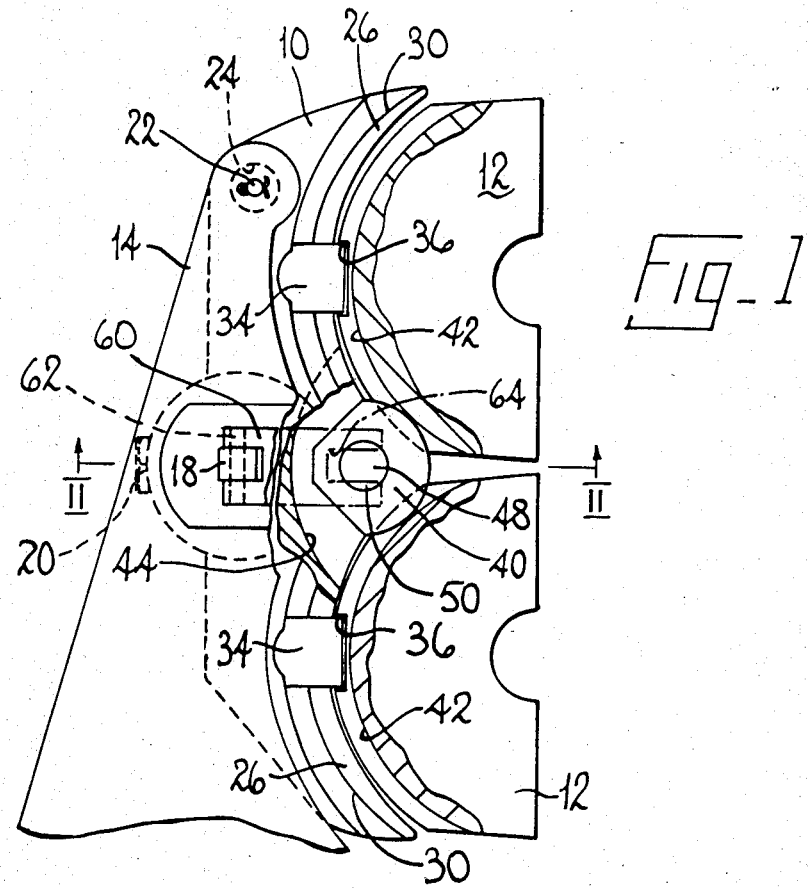
Fig_1
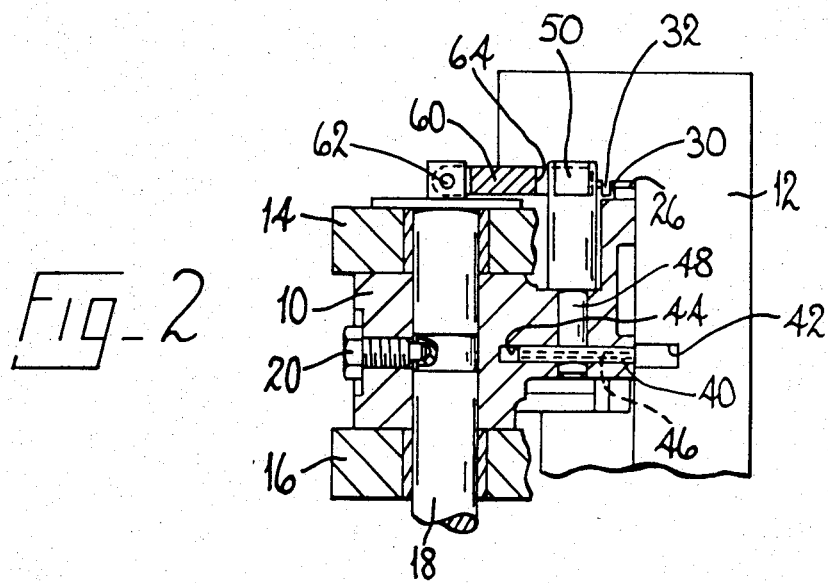
Fig_2

SUPPORT FOR A MOULD PORTION OF A GLASSWARE FORMING MACHINE

BACKGROUND OF THE INVENTION

This invention is concerned with a support for a mould portion of a glassware forming machine, the support comprising at least one upwardly-facing surface in which there is a recess so arranged that a mould portion can be mounted on the support by positioning a hook portion of the mould portion, which projects transversely of a body portion of the mould portion, above the upwardly-facing surface, and lowering the mould portion relative to the support thereby bringing the hook portion into engagement with the upwardly-facing surface and a downward projection of the hook portion into the recess so that the mould portion hangs on the support supported by the hook portion, the support also comprising a projection arranged to enter a downwardly-opening slot in the mould portion, as the mould portion is lowered as aforesaid, and to prevent the mould portion from moving transversely of the support by engagement with opposite walls of the slot.

A support as described above is used in a glassware forming machine of the individual section type to support a mould portion which co-operates with one or more mould portions to form a closed mould in which molten glass can be moulded. Conventionally, the support is mounted on an arm and the arm is moved between a mould-closed position thereof in which the mould portion cooperates with one or more further mould portions to form a closed mould and a mould-open position thereof in which the mould portion is spaced from said further mould portions. This type of support is used both for blank mould portions which form moulds in which gobs of molten glass are formed into parisons and also for blow mould portions in which parisons are blown to the shape of the article required. The arms are moved either linearly or arcuately to move between the mould-closed and mould-open positions with the downward projection of the hook portion preventing the mould portion from falling off the support. Since the recess in the upwardly-facing surface is frequently formed by an arcuate slot with open ends, the projection of the support serves to prevent the mould portion from sliding relative to the support with the downward projection of the hook portion sliding along the recess. Thus, the mould portion is held against transverse movement relative to the support. Furthermore, the mould portions can be removed from the support and replaced by further mould portions merely by raising the mould portion vertically relative to the support. This means that mould portions can be exchanged without causing excessive production losses.

With a conventional support of the type described above, it is possible due to the inertial forces set up during the movements of the mould portions that the mould portion may be displaced vertically relative to its support. In this case the mould portion can fall off its support as the downward projection of the hook portion may leave the recess in the support. This can result in damage to the glassware forming machine and/or to the mould portion and the loss of production. This vertical displacement of the mould portion relative to its support is more likely to occur on the recently-proposed type of individual section glassware forming machine in which the blow moulds are mounted on a turntable which is rapidly rotated back and forth through 180° to move the mould portions between a parison-receiving position thereof and a take-out position thereof. The turntable is subject to rapid acceleration and deacceleration so that considerable inertial and centrifugal forces are involved.

It is an object of the present invention to provide a support for a mould portion of a glassware forming machine in which vertical displacement of the mould portion relative to its support is prevented when the mould portion is mounted on its support while retaining the ability to exchange mould portions rapidly.

BRIEF SUMMARY OF THE INVENTION

The invention provides a support for a mould portion of a glassware forming machine, the support comprising at least one upwardly-facing surface in which there is a recess so arranged that a mould portion can be mounted on the support by positioning a hook portion of the mould portion, which projects transversely of a body portion of the mould portion, above the upwardly-facing surface, and lowering the mould portion relative to the support thereby bringing the hook portion into engagement with the upwardly-facing surface and a downward projection of the hook portion into the recess so that the mould portion hangs on the support supported by the hook portion, the support also comprising a projection arranged to enter a downwardly-opening slot in the mould portion, as the mould portion is lowered as aforesaid, and to prevent the mould portion from moving transversely of the support by engagement with opposite walls of the slot, wherein the support also comprises a locking member mounted for movement between an operative position thereof, in which it projects over an upwardly-facing surface of a mould portion mounted on the support and prevents upwards movement of the mould portion relative to the support, and an out-of-the-way position thereof, in which it is clear of said surface of the mould portion, and moving means for moving the locking member between its operative and out-of-the-way positions.

In a support according to the last preceding paragraph, a mould portion is held against vertical movement relative to the support by the locking member and therefore the downward projection of the hook portion cannot leave the recess. Furthermore, the mould portion can readily be removed from the support after the locking member has been moved into its out-of-the-way position.

The surface over which the locking member projects in its operative position may be provided by an upper surface of the mould portion or by a lower surface of a recess formed in the side of the mould portion.

In order to prevent the locking member from inadvertently moving into its out-of-the-way position during the operation of the glassware forming machine, the support may also comprise latch means movable between an operative position thereof, in which it prevents the locking member from moving out of its operative position, and an in operative position thereof, in which it allows the locking member to move. The latch means, when in its operative position, may also prevent the locking member from moving into its operative position so that the locking member can be prevented from moving into its operative position to allow exchange of mould portions.

Conveniently, the moving means may comprise a shaft on which the locking member is mounted, the shaft being mounted on the support for rotation about a vertical axis to move the locking member between its operative and out-of-the-way positions. In this case, the locking member may be moved between its operative and out-of-the way positions by rotation of the shaft through 180° about the vertical axis. The locking member may conveniently be a horizontally-extending plate cam having a segment which is arranged to project into a recess in the mould portion when the locking member is in its operative position and which has an outer surface which is arcuate about said vertical axis.

When glassware forming machines of the individual section type are operating in the so-called "double gob" mode, each support carries two mould portions of separate moulds so that the mould portions hang on the support side-by-side and are supported by respective hook portions. In this case, in order to enable a single locking member to be used for each support, the locking member may be arranged, when in its operative position, to project into recesses in both mould portions preventing upwards movement of the mould portions relative to the support.

BRIEF DESCRIPTION OF THE DRAWINGS

There now follows a detailed description, to be read with reference to the accompanying drawings of a mould portion of a glassware forming maching which is illustrative of the invention. It is to be understood that the illustrative support has been selected for description by way of example and not of limitation of the invention.

In the drawings:

FIG. 1 is a plan view of the illustrative support with portions broken away to show the construction; and FIG. 2 is a vertical cross-sectional view taken on the line II—II in FIG. 1.

DETAILED DESCRIPTION OF PREFERRED EMBODIMENT OF THE INVENTION

The illustrative support 10 is for a mould portion 12 of a glassware forming machine of the individual section type. The support 10 is mounted between an upper portion 14 and a lower portion 16 of an arm of the machine which is movable arcuately about an axis (not shown) to move the support 10 so that the mould portion 12 is moved between mould-open and mould-closed positions thereof. The support 10 is fixed to a vertically extending shaft 18 which is pivotally mounted on the upper and lower portions of the arm 14 and 16 for pivoting movement thereon. The support 10 is secured to the shaft 18 by a screw 20. The arrangement is such that the support 10 can pivot on the arm 14, 16 to an extent limited by a pin 22 which projects from the arm 14, 16 into a circular hole 24 in the support 10.

The support 10 projects towards the mould portion 12 beyond the arm 14, 16 and upwards beyond the portion 14 to a level above the portion 14 (see FIG. 2). The support 10 has an upwardly-facing surface 26 in which there is an arcuate upwardly opening recess 30 so arranged that the mould portion 12 can be mounted on the support 10 by positioning a hook portion 32 (see FIG. 2) of the mould portion 12, which projects transversely of a body portion of a mould portion 12, above the upwardly-facing surface, and lowering the mould portion 12 relative to the support 10 thereby bringing the hook portion 32 into engagement with the upwardly-facing surface 26 and a downward projection of the hook portion 32 into the recess 30. Thus, the mould portion 12 hangs on the support 10 supported by the hook portion 32 and is prevented by falling off by engagement between the downward projection of the hook portion 32 and the recess 30.

In order to prevent the mould portion 12 from falling off the support 10 by the downward projection of the hook portion 32 sliding along the recess 30, the support 10 also comprises a projection 34 in the form of a block fixed to the surface 26 which is arranged to enter a downwardly opening slot 36 in the mould portion 12, as the mould portion 12 is lowered as aforesaid, and to prevent the mould portion 12 from moving transversely of the support 10 by engagement with opposite walls of the slot 36. The construction of the support 10 described thus far is conventional and is well known to those familiar with glassware forming machines of the individual section type.

The support 10 also comprises a locking member 40 which is mounted for movement thereon between an operative position thereof, in which it projects into an annular recess 42 in the side of the body portion of the mould portion 12 mounted on the support 10 and prevents upwards movement of the mould portion 12 relative to the support 10, and out-of-the-way position thereof, in which it is clear of the recess 42. The locking member 40 is in the form of a plate cam which is mounted in a horizontal slot 44 in the support 10 which opens towards the mould portion 12. The locking member 40 is secured by means of a dowel 46 to a shaft 48 which is mounted on the support 10 for rotation about a vertical axis to move the locking member 40 between its operative and out-of-the-way positions. The shaft 48 extends upwardly beyond the support 10 and has an upper end portion 50 which is flattened on both sides thereof (see FIG. 1) to receive a spanner by which the shaft 48 can be turned about said vertical axis.

The locking member 40 extends horizontally and has a segment which is arranged to project into the recess 42 in the mould portion 12 when the locking member 40 is in its operative position in which it is shown in the drawings. This segment subtends an angle of approximately 180° about the vertical axis of the shaft 48. The remaining 180° segment of the plate cam 40 is arranged to extend from the vertical axis of the shaft 48 by a smaller distance than the aforementioned arcuate segment and not to extend into the recess 42. Thus, viewing FIG. 1 rotation of the shaft 48 through 180° removes the arcuate segment of the cam 40 from the recess 42 and into the recess 44. In variations of the illustrative support, the arcuate segment of the locking member 40 may subtend between 180° and 90° at the vertical axis.

The support 10 also comprises latch means movable between an operative position thereof, in which it prevents the locking member 40 from moving out of its operative position, and an inoperative position thereof, in which it allows the locking member 40 to move. The latch means comprises a latch 60 which is mounted for pivoting movemeent in a vertical plane about a pin 62 which is supported by an upper end portion of the shaft 18. An end portion of the latch 60 has a slot 64 therein which is arranged to fit over the end portion 50 of the shaft 48 when the locking member 40 is in either its operative or out-of-the-way position. The slot 64 will only fit over the upper end portion 50 when the shaft 48 is in one of two positions which are 180° apart representing the positioning of the locking member 40 in either its operative position or its out-of-the-way position. Thus, the latch means, when in its operative position in which the slot 64 is received over the upper portion 50, also prevents the locking member 40 from moving into its operative position by preventing it from moving out of its out-of-the-way position.

The illustrative support 10 is arranged to support a further mould portion 12 so that it supports two mould portions of separate moulds on that the mould portions hang on the support 10 side-by-side and are supported by respective hook portions thereof. To this end, the support comprises a further recess 30 and a further projection 34. Furthermore, the locking member 40 is arranged, when in its operative position, to project into recesses 42 in both mould portions preventing upwards movement of the mould portions 12 relative to the support 10. When the mould portions 12 are both mounted on the support 10, the shaft 48 is positioned on a line which is equi-distant from the two mould portions 12 and, as can be seen from FIG. 1, the arcuate segment of the locking member 40 projects into both the recesses 42.

In the operation of the glassware forming machine, the latch 60 prevents the locking member 40 from moving out of its operative position and the locking member 40 therefore serves to ensure that the mould portions 12 do not move vertically relative to the support 10 and cannot become displaced from the support 10. When it is desired to exchange one or both of the mould portions 12, the latch 60 is moved to its inoperative position by rotating it through 180° about the pin 62, a spanner is applied to the upper portion 50 of the shaft 48, and the shaft is turned through 180° to move the locking member 40 to its inoperative position. The latch 60 may now, if desired, be returned to its operative position so that it holds the locking member in its out-of-the-way position, and the mould portions 12 can now be removed from the support 10 by raising them and the replacement mould portions 12 can be mounted on the support 10 as described above.

I claim:

1. A support for a mould portion of a glassware forming machine, the support comprising at least one upwardly-facing surface in which there is a recess so arranged that a mould portion can be mounted on the support by positioning a hook portion of the mould portion, which projects transversely of a body portion of the mould portion, above the upwardly-facing surface, and lowering the hook portion relative to the support thereby bringing the hook portion into engagement with the upwardly-facing surface and a downward projection of the hook portion into the recess so that the mould portion hangs on the support supported by the hook portion, the support also comprising a projection arranged to enter a downwardly-opening slot in the mould portion, as the mould portion is lowered as aforesaid, and to prevent the mould portion from moving transversely of the support by engagement with opposite walls of the slot, wherein the support also comprises a locking member mounted for movement between an operative position thereof, in which it projects over an upwardly-facing surface of a mould portion mounted on the support and prevents upwards movement of the mould portion relative to the support, and an out-of-the-way position thereof, in which it is clear of said surface of the mould portion, and moving means for moving the locking member between its operative and out-of-the-way positions.

2. A support according to claim 1, wherein the upwardly-facing surface of the mould portion is provided by a lower surface of a recess formed in the side of the mould portion.

3. A support according to claim 1, wherein the support also comprises latch means movable between an operative position thereof, in which it prevents the locking member from moving out of its operative position, and an inoperative position thereof, in which it allows the locking member to move.

4. A support according to claim 3, wherein the latch means, when in its operative position, prevents the locking member from moving into its operative position.

5. A support according to claim 1, wherein the moving means comprises a shaft on which the locking member is mounted, the shaft being mounted on the support for rotation about a vertical axis to move the locking member between its operative and out-of-the-way positions.

6. A support according to claim 5, wherein the locking member is moved between its operative and out-of-the-way positions by rotation of the shaft through 180° about the vertical axis.

7. A support according to claim 5, wherein the locking member is a horizontally-extending plate cam having a segment which is arranged to project into a recess in the mould portion when the locking member is in its operative position and which has an outer surface which is arcuate about said vertical axis.

8. A support according to claim 7, wherein said segment subtends between 180° and 90° at said vertical axis.

9. A support according to claim 1, wherein the support is arranged to support two mould portions of separate moulds so that the mould portions hang on the support side-by-side and are supported by respective hook portions, and the locking member is arranged, when in its operative position, to project into recesses in both mould portions preventing upwards movement of the mould portions relative to the support.

* * * * *